United States Patent [19]

Aoki

[11] Patent Number: 4,836,962
[45] Date of Patent: Jun. 6, 1989

[54] MATERIAL INJECTING METHOD AND MATERIAL MEASURING APPARATUS IN INJECTION MOLDING MACHINE

[76] Inventor: Katashi Aoki, 6037 Ohazaminamijo, Sakakimachi, Hanishina-gun, Nagano-ken, Japan

[21] Appl. No.: 26,846
[22] PCT Filed: Jun. 17, 1986
[86] PCT No.: PCT/JP86/00303
  § 371 Date: Feb. 12, 1987
  § 102(e) Date: Feb. 12, 1987
[87] PCT Pub. No.: WO86/07561
  PCT Pub. Date: Dec. 31, 1986

[30] Foreign Application Priority Data

Jun. 17, 1985 [JP] Japan ................. 60-131535
Mar. 14, 1986 [JP] Japan ................. 61-56560

[51] Int. Cl.$^4$ .................. B29C 45/23; B29C 45/76
[52] U.S. Cl. .................. 264/40.5; 264/40.1; 425/145; 425/166; 425/171
[58] Field of Search ............. 264/40.1, 40.5; 425/145, 167, 169, 171, 166, 587

[56] References Cited

U.S. PATENT DOCUMENTS 3,317,962  5/1967  Morse .......................... 425/587
3,888,388  6/1975  Mahoney ..................... 425/166
4,435,142  3/1984  Morita et al. ................ 425/145

FOREIGN PATENT DOCUMENTS 52-43869  11/1977  Japan .
57-50334   3/1982  Japan .
57-51437   3/1982  Japan .
58-53426   3/1983  Japan ................. 264/40.1
861088     9/1981  U.S.S.R. ............. 425/145

Primary Examiner—Richard V. Fisher
Assistant Examiner—Linda S. Evans
Attorney, Agent, or Firm—Ostrolenk, Faber, Gerb & Soffen

[57] ABSTRACT

An injection molding method operable in conjunction with an injection molding machine having an injection screw which rotates and moves backward while a preset dosage of molding material is injected into the molding machine. As the injection screw moves backward its arrival at a predetermined point relative to a discharge nozzle is detected by a sensor which initiates stoppage of feeding of material into the machine. Further backward movement of the injection screw resulting from internal pressure in the injection cylinder is arrested by an adjustably locatable stopper, disposed behind the injection screw. The stopper is designed to be located at a position that produces molded products of consistent quality. Further, in accordance with a preferred embodiment of the invention, the stop position of the injection screw is also used as a starting point for the injection screw in a subsequent injection step during which the dosage of material is injected into a molding cavity.

10 Claims, 2 Drawing Sheets

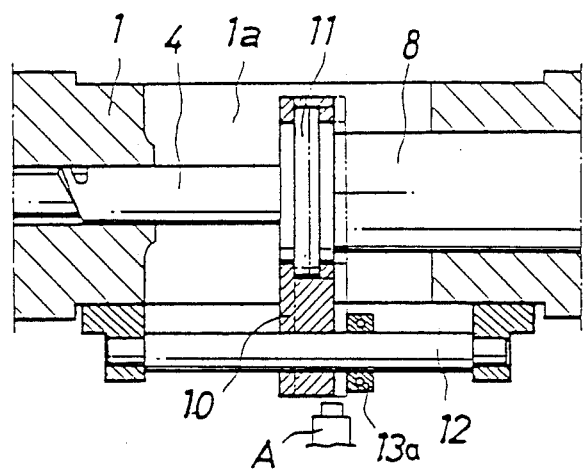
FIG_3
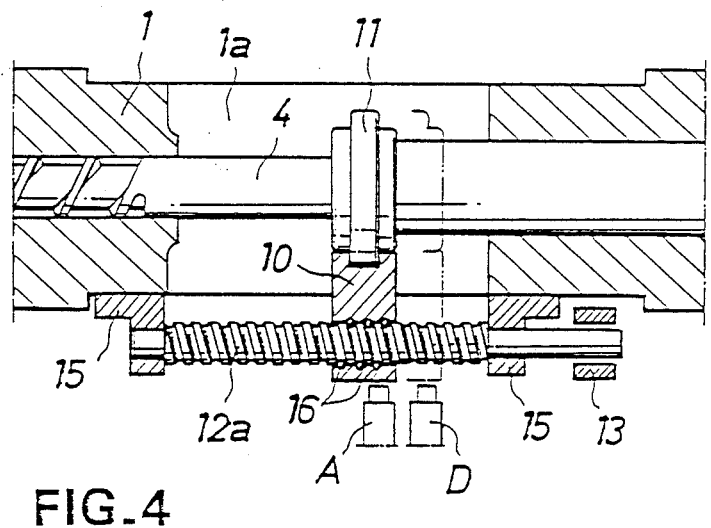
FIG_4

MATERIAL INJECTING METHOD AND MATERIAL MEASURING APPARATUS IN INJECTION MOLDING MACHINE

TECHNICAL FIELD

This invention relates to a material injecting method and a material measuring apparatus in an injection molding machine used for molding synthetic resin products.

BACKGROUND OF THE INVENTION

The first step in carrying out injection molding by the use of a molding machine in which an injecting cylinder is provided interiorly of a cylinder involves measurement of molding material required for one shot.

Ordinarily, a screw is rotated by applying back pressure thereto, and the quantity of material is measured. When the screw is moved backward to a predetermined position, rotation of the screw stops. If a distance of the screw from a position at which the screw starts its rotation to a position at which the screw stops is constant, it is considered that a quantity of the measured material is also constant. In addition, since the screw is moved backward by internal pressure of the cylinder produced by the rotation of the screw, the position of the backward movement of the screw is electrically controlled, and the stopped position of the screw is established as a measurement-completion position, which position is used as a reference to control pressure, speed, retaining pressure, position and time etc. in the injection steps.

However, even if the screw is immediately stopped by means of a device actuated by a signal from a measurement completion detector, internal pressure still remains in the cylinder, and therefore the screw is affected by the internal pressure. In the measurement completion position, back pressure applied when measurement is made is reduced down to such an extent that material is not discharged from the tip of a nozzle. Such a state is maintained until the subsequent injection step starts. Because of this, the screw continues to be moved backward by the internal pressure even after the screw has been stopped from its rotation. With this backward movement, the molten material around the screw enters into the front portion of the screw from a clearance between a check valve in an open state at the end of the screw and a valve seat, and measurement is naturally carried out even after completion of measurement and the quantity of material is increased. In addition, the internal pressure varies with the plasticized state and density of material around the screw, and variation in measurement after completion of measurement, that is, the amount of backward movement of the screw is not repeated.

Actually, when a number of products are molded at a time, unacceptably molded products result. It has been found by tests conducted to find the accuracy of material measured under the fixed stroke in an accurately controlled condition, that an error in weight of ±1.5 occurs on average.

The aforesaid error in weight is a weight % in which material of approximately 80% of measurement required for one shot of a mold is measured, and the total quantity thereof, that is, material is injection filled into the mold to the termination point of the injection stroke, and molded products which are insufficient in filling are repeatedly molded dozens of times under the same condition.

It has been found by the present inventor that when normal material and regenerated material (that is material which has been used previously for molding and which has irregular particles therein) are respectively injected under the same condition the regenerated material experiences a great weight error.

The present inventor has found from the foregoing that the variation in injection quantity not only results from the responsiveness during the closure of the check valve but is greatly affected by the density and plasticized state of material from a material inlet at the rear of the cylinder to the end of the screw at the front of the cylinder, whereby the quantity of molten material to be measured at the front of the screw is assumed to be varied; and the quantity of material injected on every shot cannot be quantitized on account of the above mentioned problems.

SUMMARY OF THE INVENTION

It is therefore an object of the invention to provide a new material injecting method in which the screw position is locked at a predetermined position after measurement to thereby eliminate irregularities in the quantity of injected material.

It is a further object of the invention to provide a material injecting apparatus which can promptly detect a measurement completion position and a screw stop position, and can very easily perform establishment of these positions.

For achieving the aforementioned objects, according to this invention, the backward movement of the screw after completion of measurement is stopped at a given position, said position being used as a start point of the injection step, and there is provided an apparatus which assures that the backward stop position of the screw is constant every measurement to render precise measurement of material possible.

According to the aforementioned apparatus, a member rotatably mounted on a flange at the rear end of a screw is projected externally from a hole formed in the side of a cylinder, an end is inserted into a guide bar laterally mounted on the side of the cylinder, and a stopper for defining the backward movement of the member is movably mounted on the guide bar or the guide bar is formed into a screw shaft rotated by said member and a brake member is mounted on the screw shaft.

BRIEF DESCRIPTION OF THE DRAWINGS

The drawings schematically show an injection molding machine provided with a material measuring apparatus used for the method according to the present invention.

FIG. 3 is a cross sectional view of a rear portion of a screw on which a material measuring apparatus is mounted; and FIG. 4 is a cross sectional view of a rear portion of a screw on which a material measuring apparatus is mounted according to a further embodiment.

BEST MODE FOR CARRYING OUT THE INVENTION

Figure 1:
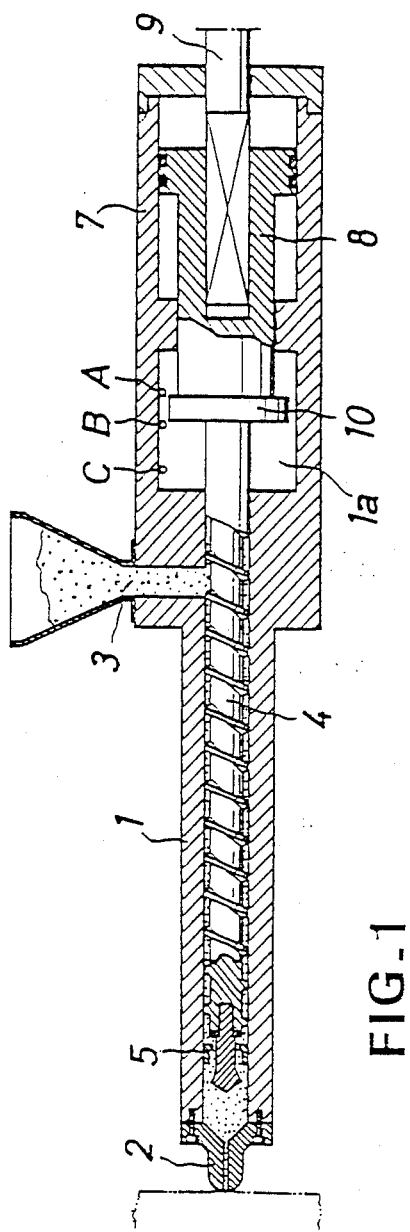
FIG. 1 is a schematic longitudinal sectional elevation.
Figure 2:
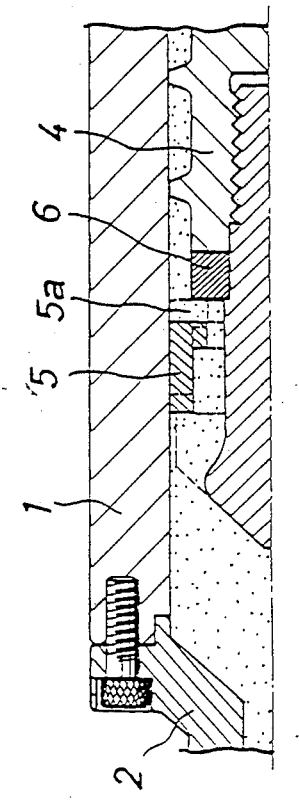
FIG. 2 is a fragmentary longitudinal sectional elevation of an extreme end of a cylinder.

Referring to the drawings, an injection cylinder indicated at 1 has a nozzle 2 at the end thereof and has a material charging hole 3 at the rear thereof. The cylinder 1 is interiorly provided with an injection screw 4 which is rotatable and movable forward and backward.

A ring-like check valve 5 urged by means of a spring is provided around at the extreme end of the screw 4 leaving a required spacing 5a. Reference numeral 6 denotes valve seat. The rear end of the screw 4 is connected to a ram 8 within a hydraulic cylinder 7 connected to the rear end of the cylinder 1, the ram 8 being axially movably connected to a rotational shaft 9.

Reference characters A, B and C designate respectively, a detector provided at a measurement completion position, a detector for switching injection pressure and a detector provided at an injection stop position. They comprise respectively limit switches or proximity switches actuated by a member 10 mounted at the rear end of the screw 4, but detection at respective positions may be made by other electric means.

FIG. 3 shows a material measuring apparatus in which the member or leg 10, rotatably mounted on a flange 11 at the rear end of the screw, projects externally from a hole portion 1a formed in the side of the cylinder, an end of member 10 is inserted into a guide bar 12 that is laterally mounted on the side of the cylinder, and a stopper means including a stop position means in the form of a stopper member 13a for defining the backward movement of the member 10 is movably mounted anywhere along an axial path between two end positions on the guide bar 12.

Measurement of material is carried out by the rotation of the screw 4 while applying back pressure in a conventional manner. The screw 4 is moved backward by pressure within the cylinder produced by rotation thereof, and the rotation of the screw 4 is stopped at a position where the measurement completion detector A is actuated by the member 10 or the back pressure is reduced to complete measurement.

After the rotation has been stopped, the screw 4 is moved backward by internal pressure of the cylinder, but the backward movement stops by abutment of the member 10 against the predetermined stopper member 13a.

The amount of backward movement of the screw 4 after it stopped its rotation in the prior art embodiment was 3.5 to 5.0 m/m under the conditions of screw—38 φ, back pressure—20 kg/cm², measuring stroke—35 m/m and material—styrol, the amount of backward movement has a difference of ±1.5 m/m. Also, a difference in weight of the injection-molded product varies with the difference in the amount of backward movement, but in the case where the stop position is made constant by the stopper member 13a, that difference is in an allowable range in terms of precision.

The stop position of the screw 4 is set by moving the position of the stopper 13a forward and backward at the time of injection adjustment carried out at the beginning of injection molding. This position is used as a start point of injection step to effect injection molding. The screw 4 is first moved forward at low pressure (15 Kg/cm²), and the check valve 5 is closed. Then the member 10 actuates the injection pressure switching detector B thereby the injection pressure is switched to high pressure and to actuate the injection stop detector C, completing the injection step.

In the material measuring apparatus shown in FIG. 4, the guide bar 12 is formed as a screw shaft 12a, and rotation of the screw shaft 12a may be braked to ensure that the backward position of the screw 4 constant. The apparatus comprises the rotatable screw shaft 12a juxtaposed at the rear portion of the screw on which the flange 11 is provided, the member 10 provided over the screw shaft 12a and the flange 11, a stopper means including a braking system 13 provided on the end of the screw shaft 12a and a stop position means in the form of a material measurement detector D at the rear of and adjacent to the measurement completion detector A for actuating the braking system 13 to stop rotation of the screw shaft 12 and to stop the rearward movement of the screw 4 at a predetermined position.

The screw shaft 12a is formed from a ball screw shaft to provide smooth rotation. The screw shaft is placed in the hole portion 1a formed in the side at the rear of the cylinder 1 and mounted on the side of the cylinder by means of bearings 15.

The member 10 further comprises a nut portion threadedly engaged with the screw shaft 12a through a plurality of balls 16 received in threaded grooves and a portion fitted in the flange 11 to allow rotation of the flange 11, the member 10 being moved forward and backward together with the screw 4 while rotating the screw shaft.

The above-described braking system comprises an electromagnetic brake, an electric servo-motor and the like, schematically shown at 13 and is operated to provide braking in response to an electric signal from the material measurement detector D.

Next, the operation of the apparatus shown in FIG. 4 will be described.

First, measurement of material is carried out by rotating the screw 4 while applying back pressure in a conventional manner. The screw 4 is moved backward by pressure within the cylinder generated by the rotation of the screw 4, and when the position of the member 10 is detected by the measurement completion detector A, the rotation of the screw 4 is stopped at that position by the electric signal from the measurement completion detector A and the back pressure is reduced to complete measurement.

After rotation has been stopped, the screw 4 is naturally moved backward by internal pressure of the cylinder. However, when the position of the member 10 is detected by the predetermined material measurement detector D, the detector D is actuated to provide an electric signal for the braking system 13, and the braking system 13 is energized and actuated to stop the rotation of the screw shaft 12a.

Thereby the backward movement of the member 10 is retarded and the screw 4 stops at that position. This stop position is set by setting the material measurement position detector D at the backward position of the screw at which a molded product of highest quality was obtained. Said position is used as a start point of injection step to start the injection step.

As described above, according to the present invention, the backward movement of the screw is completely stopped after measurement has been completed, said stop position is used as a start point of the injection step to remove the irregularity in quantity of injection caused by the backward movement of the screw after completion of measurement of the quantity of injected material. Therefore, the present invention has the following effects:

(1) Injection molding conditions are easily provided.

(2) True, fine and stabilized molding can be performed.

(3) Size, weight, density and appearance of molded products are free from irregularities.

(4) Even if a large quantity of regenerated and pulverized material are mixed, precise molding may be performed. Particularly, in the case of multi-cavity molding using expensive material such as engineering plastics and in the case where the runner is heavier than the molded products, even if the runner is broken into fragments for use, precise molding is possible, which is therefore economical.

As described above, according to this invention, a material measuring apparatus for stopping the backward movement of screw after completion of measurement at a required position is mounted whereby injection molding of high precision in dimension may be carried out; and in addition, since the apparatus may be applied to a conventional injection molding machine, the present invention may be widely utilized as an optimum material injection method and material measuring apparatus.

What is claimed is:

1. A method for controlling a dosage of injected material in an injection molding machine, comprising the steps of:

feeding a material to be injected into the injection molding machine;

enabling an injection screw of the molding machine to rotate and move backward away from a discharge nozzle of the injection machine to set the size of the dosage of material;

providing a measurement completed sensor, detecting the arrival of a predetermined portion of the injection screw at the sensor and terminating feeding of the material responsive thereto;

locating a variably positionable stop position means of a stopper means at a selected location relative to the injection screw in a manner that is effective to stop backward movement of the injection screw at a stop position, subsequent to the arrival of the injection screw at the sensor, the stop position means being movably locatable relative to the injection screw along an axial path, anywhere between two end positions on the axial path; and stopping backward movement of the injection screw at the stop position by actuating the stopper means.

2. The method of claim 1, further comprising injecting the dosage of material into a molding cavity and employing the stopped position of the injection screw at the stopper means as a starting point for the injection screw during the injecting step.

3. The method of claim 2, further including preadjusting the location of the variably positionable stop position means prior to starting of the feeding step in order to set the quality of product obtained from the method.

4. An injection molding machine, comprising:

an axially extending injection cylinder having front and rear regions, a discharge nozzle at the front region and a charging hole axially spaced rearward of the discharge nozzle;

a rotatable and axially movable injection screw in the injection cylinder, the injection screw being movable backwardly away from the discharge nozzle and having a detectable member that moves together with the injection screw;

means for feeding a material to be injected into the cylinder;

a sensor located at a predetermined position in the vicinity of the rear region of the cylinder, the sensor being effective for detecting the arrival of the detectable member thereat and means for terminating the feeding of the material responsive to said detection; and a stopper means, disposed generally rearward of the injection screw and including a variably postionable stop position means.

5. The injection molding machine of claim 4, in which the stopper means comprises a guide rod parallel to and spaced from the injection screw, a leg securely coupled to the injection screw for movement therewith, the leg moving along said guide rod, and wherein the stop position means includes a stopper member movably locatable at a desired location on the guide rod and effective for engaging the leg and for arresting backward movement of the injection screw.

6. The injection molding machine of claim 5, further comprising a first detector for initiating injection pressure in the injection molding machine, the first detector being spaced away from the sensor axially toward the discharge nozzle.

7. The injection molding machine of claim 6, further comprising a second detector for detecting arrival of the leg at the second detector and for initiating stoppage of the injection cycle in the molding machine, the second detector being spaced axially from the first detector toward the discharge nozzle.

8. The injection molding machine of claim 4, wherein the stopper means comprises a screw shaft mounted parallel to and spaced from the injection screw, a leg mounted to the injection screw and mechanically coupled to the screw shaft in a manner which causes the screw shaft to rotate as the injection screw moves forward and backward in the cylinder and a braking device for braking the screw shaft and thereby stopping backward motion of the injection screw, and wherein the stop position means includes a movable position detector locatable at a desired position for detecting the leg on the injection screw and for actuating the braking device.

9. The injection molding machine of claim 8, wherein the braking device comprises an electromagnetic brake.

10. The injection molding machine of claim 9, further comprising an electric servo-motor for operating the electromagnetic brake.

* * * * *